Jan. 5, 1932.    W. W. HALE    1,839,671
METHOD OF AND APPARATUS FOR POPPING CORN
Filed Nov. 6, 1929    2 Sheets-Sheet 1
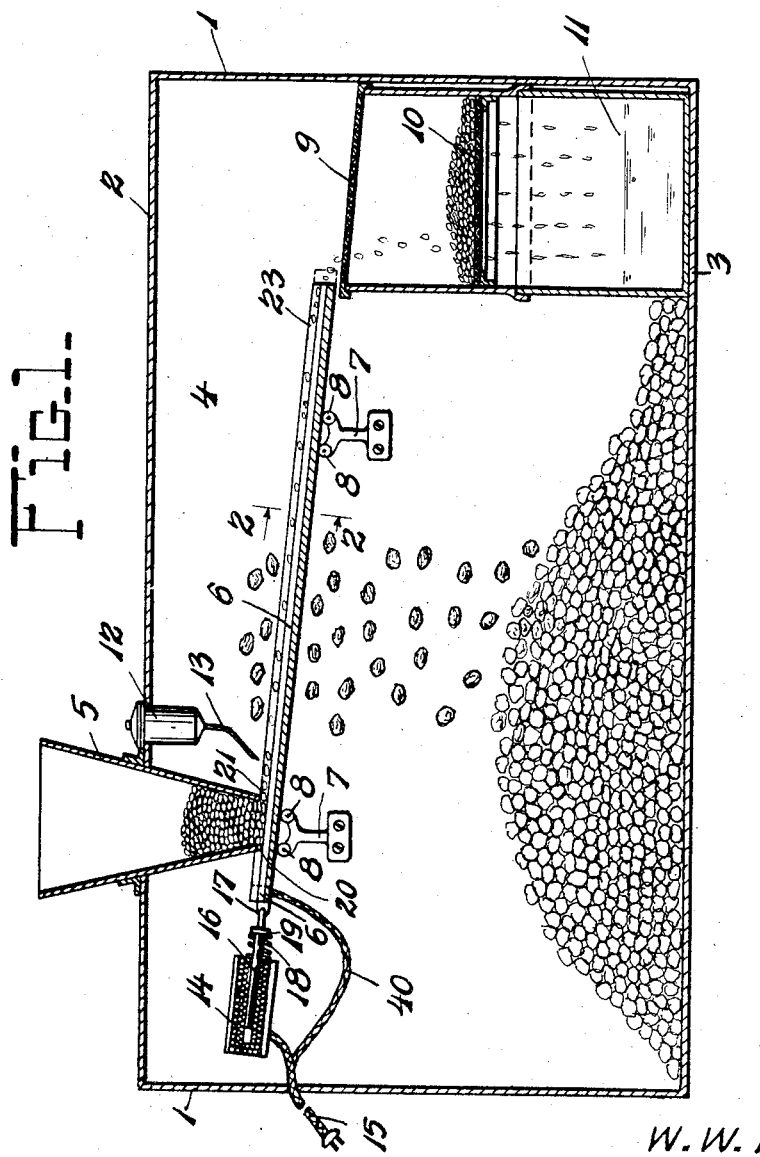
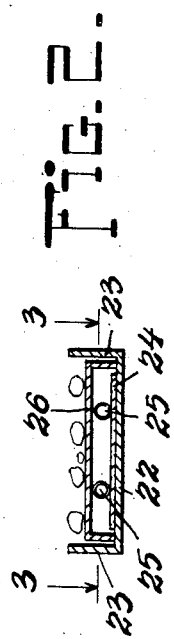
Inventor
W. W. Hale.

Jan. 5, 1932.  W. W. HALE  1,839,671
METHOD OF AND APPARATUS FOR POPPING CORN
Filed Nov. 6, 1929   2 Sheets-Sheet 2
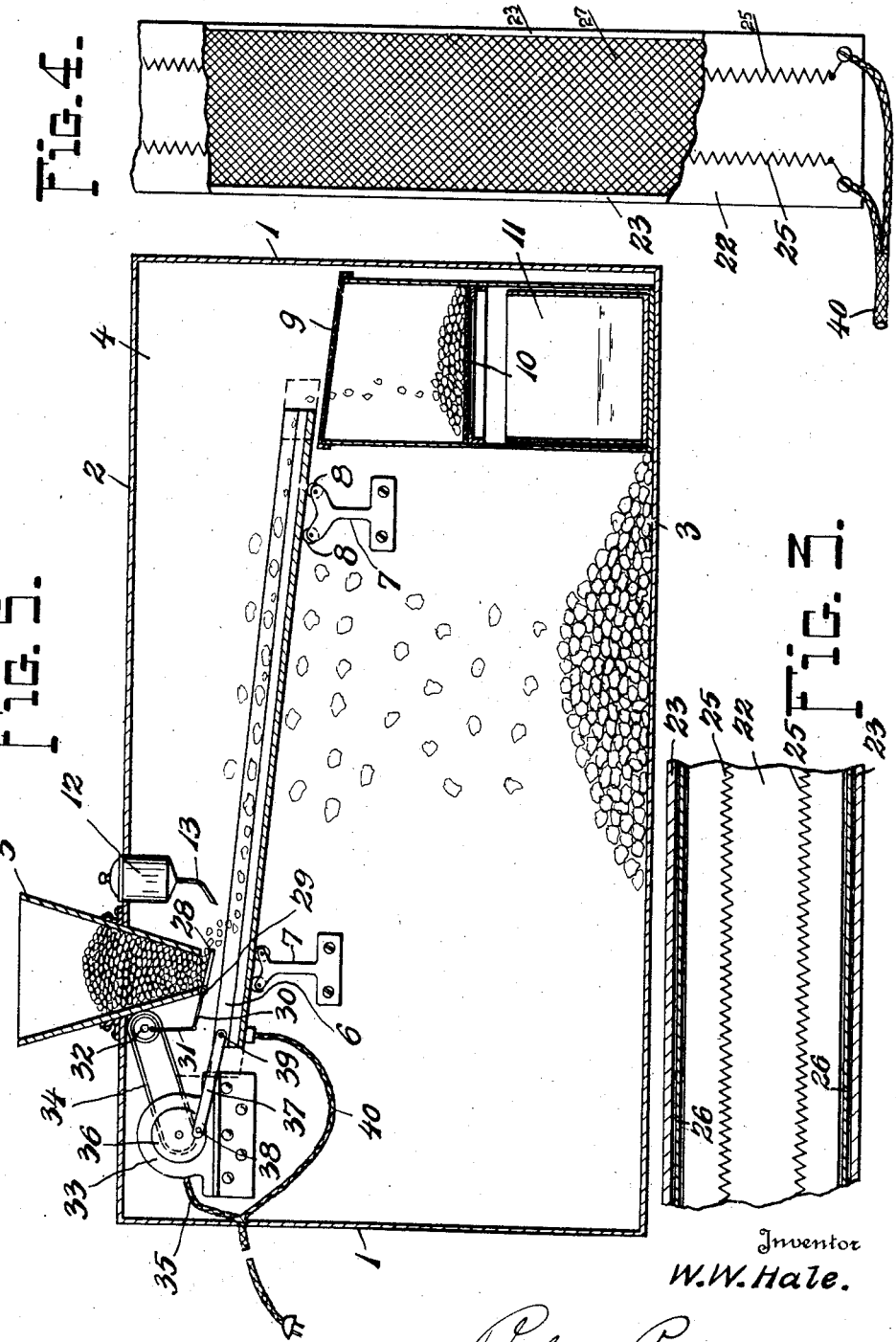

Patented Jan. 5, 1932

1,839,671

UNITED STATES PATENT OFFICE

WILLIS W. HALE, OF CLEVELAND, OHIO

METHOD OF AND APPARATUS FOR POPPING CORN

Application filed November 6, 1929. Serial No. 405,151.

In the art of popping corn at the present time, it is customary to place the pop corn kernels in some sort of a closed container made either of solid metal or of some mesh-like material such as wire screen. The container and pop corn kernels held therein are then heated so that the temperature of the pop corn kernels will reach the proper degree whereupon they will pop. A large number of kernels are usually placed in the container at one time and the various kernels reach the popping temperature at different times. The result is that some of the kernels quickly reach the popping temperature and pop, thereby making the finished product, which must remain in the container, subject to the action of the heat thereon, although the need for heat to these kernels which have already been popped has ceased. It will, therefore, be seen that a large number of the popped kernels are still heated to a high degree of temperature after their popping action has been performed, which heating has a detrimental effect upon the finished product.

One of the objects of the present invention is the provision of a new method of popping corn whereby the above set forth disadvantages will be eliminated. This new method in its simplest form comprises the placing of pop corn kernels upon a heating unit for raising the temperature of the pop corn kernels to a sufficient height to cause popping of the same. When the kernels pop it is well known that the action is a sudden splitting open of the kernel which causes the same to hop or jump, and advantage is taken of this inherent action of the popping of the kernels by allowing them to jump or hop free from the heating unit, thereby removing the source of excessive heat thereto as soon as the popping action has ceased.

A further object of the invention is the provision of an apparatus for carrying out the new method of popping corn as outlined above. Such an apparatus broadly comprises a heating unit, a means for feeding pop corn kernels to the heating unit usually in the form of a feed hopper, and instrumentalities for causing the pop corn kernels to move along the heating unit. The heating unit is preferably made relatively narrow and elongated so that the kernels may readily jump therefrom upon popping open.

Another object of the invention is the provision of novel apparatus for continuously popping the pop corn kernels. This apparatus includes a heating unit, a means for feeding pop corn kernels to one end of the heating unit, instrumentalities to cause the same to move slowly from one end of the heating unit to the other end thereof, and separating devices disposed at the end of the heating unit opposite from the feeding means for separating the popped and unpopped kernels.

In the preferred form of the invention the heating unit comprises a narrow elongated tray placed at an angle to the horizontal, the tray having upstanding edges or flanges which are sufficiently high to retain the unpopped kernels thereon but which are low enough to allow the popping kernels to jump or hop thereover upon popping action. The heating unit is caused to vibrate, preferably by means of a solenoid and an armature associated therewith, the vibrating action of the heating unit together with its angular position in respect to the horizontal causing the kernels placed thereon to move therealong under the action of gravity and the agitation produced by the solenoid mechanism.

With these and other objects and advantages in view, certain other constructions, combinations, and arrangements of parts will become apparent as the description of the invention proceeds.

For a full and more complete understanding of the invention, reference may be had to the following description and accompanying drawings, wherein—

Figure 1 is a sectional view of a corn popping apparatus made in accordance with my invention.

Figure 2 is a sectional view taken about on the line 2—2 of Figure 1 and brings out the construction of the heating unit.

Figure 3 is a fragmentary sectional view taken about on the line 3—3 of Figure 2.

Figure 4 is a modified form of heating unit wherein a wire screen is placed over the electrical heating elements, and Figure 5 is a sectional view through a modified form of my invention.

While a preferred specific embodiment of my invention is herein set forth, it is to be understood that I am not to be limited to the exact constructions illustrated and described, because various modifications of these details may be provided in putting the invention into practice within the purview of the appended claims.

Throughout the following description and various figures of the drawings like reference characters denote corresponding parts.

A casing or container comprising the ends 1, top 2, bottom 3, and sides 4, has a feed hopper 5 disposed at the upper portion thereof and secured by any suitable means to the top 2. The feed hopper 5 is open at its lowermost extremity and a heating unit referred to generally as 6 has one end thereof placed immediately below the opening in the feed hopper 5. The heating unit 6 is supported by any suitable means such as brackets 7 secured to one of the sides 4, which brackets are provided with anti-friction rollers 8 upon which the heating unit 6 rests. It is to be noted that the brackets 7 are so placed that the heating unit 6 slants downwardly at a small angle to the horizontal from the feed hopper 5. Directly below the lowermost end of the heating unit 6 is a separating device comprising a large mesh screen 9, which does not allow the passage of popped kernels therethrough that might project themselves from the track in the direction of discharge but which does permit the passage of the unpopped kernels. Immediately below the screen 9 is a second screen 10 of smaller mesh which separates the unpopped kernels but allows any lubricant such as butter which may be used in the popping process to pass therethrough. The butter is collected in a container 11 placed below this second screen 10. Any suitable means for supplying butter to the heating unit if the wet method of popping corn is to be used, such as shown by the container 12 having a spout 13, which container 12 may be heated in any desired manner, may be availed of. A solenoid 14 having suitable electrical connections as shown at 15 is provided with an armature 16, one end of which is secured to the heating unit 6 as shown at 17. A spring 18 is disposed between an enlarged portion 19 of the armature 16 and the solenoid 14 as is usual in such constructions. It is to be noted that one edge of the feeding hopper 5 is shown at 20 contacts with the upper portion of the heating unit 6 so as to properly hold the same in engaged relation with the anti-friction rollers 8. Another edge of the feeding hopper 5 is slightly spaced from the heating unit 6 as shown at 21 so as to allow the passing of pop corn kernels therethrough and on to the heating unit 6.

Referring now to Figures 2 and 3, it will be seen that the heating surface or unit comprises a substantially U-shaped tray of elongated formation having a bottom 22 and vertically extending sides 23. A strip of insulating material 24 is placed upon the bottom 22 and suitable electrical heating elements 25 are placed upon the insulating material 24. A second U-shaped member 26 is inverted so that the upstanding sides thereof contact the bottom 22 of the first U-shaped member and the bottom of the U-shaped member 26 is placed over the heating elements 25 and forms a support for the pop corn kernels. It is to be noted that the sides 23 extend slightly above the bottom of the member 26 so as to retain the pop corn kernels thereon. However, these sides 23 do not extend sufficiently high to prevent the hopping or jumping of the kernels thereover upon popping action of the same.

In Figure 4 a slightly modified form of heating unit 6 is shown, wherein a fine mesh screen 27 is placed just above the heating elements 25 to form a support for the pop corn kernels.

In Figure 5 a modified form of feeding mechanism for the feed hopper 5 has been shown, and also a different method for agitating the heating unit 6 has been disclosed. The feed hopper 5 in this instance is placed slightly above the heating unit 6 and the opening in the said hopper 5 is provided with a door or closure 28 pivoted as shown at 29 and has secured thereto or made integral therewith an extension 30. A crank 31 has one end secured to the extremity of the extension 30 and the other end pivotally mounted near the periphery of a pulley 32 which is drivably connected to an electric motor 33 by means of a belt 34. Suitable electrical connections denoted 35 are provided for supplying electrical power to the motor 33. The motor 33 is also provided with a wheel 36 to which a crank 37 is pivotally connected near the periphery thereof as shown at 38, the other end of the crank 37 being pivotally connected to the heating unit 6 as shown at 39. Electrical current is supplied to the heating elements 25 by suitable electrical conductors as shown at 40.

In the use of the preferred form of my device, pop corn kernels are supplied to the feed hopper 5 and electrical power is supplied to the heating elements 25 and solenoid 14. The armature 16 associated with the solenoid is reciprocated thereby which in turn reciprocates or vibrates the heating unit 6. Partly through the action of gravity and partly due to the vibration of the heating unit 6, the pop corn kernels contained in the feed hopper 5 are caused to pass through the opening as shown at 21 and slowly move down the heating unit 6 toward the discharge end thereof. If it is desired to use the wet method of popping corn, butter may be supplied by the container 12 and spout 13 therefor. As the pop corn kernels slowly move along the heating unit 6 they will be heated until they reach the popping temperature, whereupon they will pop, the popping action causing them to jump or hop into the air and over the side pieces 23 of the heating unit 6. The popped kernels will thus fall upon the bottom 3 of the container where they will remain until it is desired to use the same. In the event that part of the kernels remain unpopped during their passage over the heating unit 6 or that other of the kernels do pop but remain on the heating unit 6, they will be separated by the screens 9 and 10 while the butter, if the wet method is used, will be collected in the container 11.

The operation of the modified form of the device is very similar except that a positive means is provided for feeding the kernels to the heating unit 6 as shown by the closure 28 and operating instrumentalities 30, 31, and 32. Likewise, the said unit 6 is caused to vibrate in substantially the same manner but a motor and crank associated therewith have been substituted for the solenoid arrangement as shown in the preferred form of the invention.

From the foregoing it will be seen that I have provided a novel method of popping corn together with an apparatus for carrying out this method. The apparatus is also novel in providing a mechanism for continuously popping corn wherein the kernels are being continually fed into one end of a heating unit moved thereover and discharged at the other end thereof.

Having thus described my invention, what I claim as new and desire to secure by Letters Patent of the United States, is—

1. In a corn popping machine, the combination with a housing, of a single straight elevated track forming a heating unit mounted within the housing, a heating element for heating the track to a temperature sufficient to pop corn fed thereon, means for feeding pop corn kernels to the track, means for causing the kernels to freely gravitate along the track to pop while in contact therewith, whereby they will jump from the track and collect on the bottom of the housing, and means adjacent the discharge end of the track for separating the unpopped kernels from any popped kernels projecting in the direction of discharge.

2. In a corn popping machine, the combination with a housing, of an elongated track forming a heating unit mounted within the housing, means for heating the track to a temperature sufficient to pop kernels of pop corn fed thereon, means for feeding pop corn kernels to the track, the said track permitting the kernels to freely gravitate therealong and to pop while in contact therewith, the popping action of the kernels causing them to jump from the rack as they pop, while the unpopped kernels continue along the track, substantially all of the popped kernels collecting at the bottom of the housing, means adjacent the feeding means for supplying the kernels with a lubricant as they pass onto the track, means for shaking the track, and collecting means at the discharge end of the track for collecting the unpopped kernels, the collecting means comprising a member for separating the unpopped kernels from any popped kernels projected in the direction of discharge, means for retaining the unpopped kernels while permitting lubricant to drain therefrom, and a lubricant receiving container below and adjacent to the kernel retaining means, the lubricant receiving container being contained in a bottom compartment of the collecting means.

3. In a corn popping machine, the combination with popcorn feeding means, of a substantially straight, inclined track forming a heating unit for receiving kernels of popcorn from the feeding means, means for heating the track to popping temperature of the kernels as they gravitate along the track, the track being adapted to permit popped kernels jumping therefrom through the explosive effect of their popping action to effect a substantially clean separation of the popped from the unpopped kernels passing along the track until discharged therefrom, means for flavoring the kernels with the liquid as they are fed upon the track, means for shaking the track to facilitate passage of the kernels therealong, and means for receiving the unpopped kernels from the track, the said means comprising a screen adapted to retain any popped kernels projected in the direction of discharge while permitting the unpopped kernels to pass therethrough, a second screen of a mesh sufficiently small to retain the unpopped grains while permitting drainage thereof, and a receptacle for collecting the liquid drained therefrom.

4. In a corn popping machine, the combination with a housing, of an elongated track forming a heating unit mounted within the housing, means for heating the track to a temperature sufficient to pop kernels of popcorn fed thereon, means for feeding popcorn kernels to the track, the said track permitting the kernels to freely gravitate therealong and to pop while in contact therewith, the popping action of the kernels causing them to jump from the track as they pop, while the unpopped kernels continue along the track, substantially all of the popped kernels collecting at the bottom of the housing, means adjacent the feeding means for supplying the kernels with a lubricant as they pass onto the track, means for shaking the track, and collecting means at the discharge end of the track for collecting the unpopped kernels, the collecting means comprising a member for separating the unpopped kernels from any popped kernels projected in the direction of discharge.

In testimony whereof I affix my signature.

WILLIS W. HALE.